US012332485B2

United States Patent
Lawson (10) Patent No.: US 12,332,485 B2
(45) Date of Patent: Jun. 17, 2025

(54) METHODS AND SYSTEMS FOR ALIGNMENT AND POSITIONING OF OPTICAL FIBERS

(71) Applicant: RAM Photonics Industrial, LLC, Webster, NY (US)

(72) Inventor: Joseph Lawson, Rochester, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 179 days.

(21) Appl. No.: 18/121,448

(22) Filed: Mar. 14, 2023

(65) Prior Publication Data

US 2023/0296847 A1 Sep. 21, 2023

Related U.S. Application Data

(60) Provisional application No. 63/320,027, filed on Mar. 15, 2022.

(51) Int. Cl.
*G02B 6/36* (2006.01)
*G02B 6/024* (2006.01)
(Continued)

(52) U.S. Cl.
CPC ......... *G02B 6/3803* (2013.01); *G02B 6/3684* (2013.01); *G02B 6/024* (2013.01); *G02B 6/4221* (2013.01)

(58) Field of Classification Search
CPC .................................................. G02B 6/3808
See application file for complete search history.

(56) References Cited

U.S. PATENT DOCUMENTS

| 5,140,167 A | 8/1992 | Shaar et al. |
| 5,340,371 A * | 8/1994 | Dyott .................. G02B 6/3803 |
| | | 269/254 R |

(Continued)

FOREIGN PATENT DOCUMENTS

| JP | 3853841 B6 * | 9/2006 |
| JP | 2015075651 A | 4/2015 |

(Continued)

OTHER PUBLICATIONS

PCT/US2023/016088, "International Search Report and the Written Opinion", Aug. 31, 2023, 9 pages.
Application No. PCT/US2023/015178, "International Search Report and Written Opinion", Jun. 27, 2023, 7 pages.

(Continued)

*Primary Examiner* — Michelle R Connelly
*Assistant Examiner* — Eric Paul Struth
(74) *Attorney, Agent, or Firm* — KILPATRICK TOWNSEND & STOCTON LLP (57) ABSTRACT

Methods and systems that can be used for aligning and positioning of an optical fiber are provided herein. For example, an optical fiber alignment and positioning system including a vacuum stage may be provided. The vacuum stage may include a vacuum inlet operable to be in fluid communication with a vacuum source and one or more passages extending through the vacuum stage. The vacuum stage may include an optical fiber channel. A plurality of vacuum ports may pass through the optical fiber channel. The optical fiber channel may include a directional friction surface. The directional friction surface may include a first friction factor in a first direction and a second friction factor in a second direction. The directional friction surface may contact a portion of the optical fiber and may allow movement in the second direction but resist movement of the optical fiber in the first direction.

20 Claims, 6 Drawing Sheets

(51) Int. Cl.
*G02B 6/38* (2006.01)
*G02B 6/42* (2006.01)

(56) References Cited

U.S. PATENT DOCUMENTS

| | | |
|---|---|---|
| 5,346,583 A | 9/1994 | Basavanhally |
| 5,506,928 A * | 4/1996 | Evans .................... G02B 6/362 385/136 |
| 5,926,594 A | 7/1999 | Song et al. |
| 6,587,618 B2 | 7/2003 | Raguin et al. |
| 6,633,700 B2 | 10/2003 | Bellman et al. |
| 8,110,791 B2 | 2/2012 | Laycock et al. |
| 2003/0031409 A1 | 2/2003 | Bellman et al. |
| 2011/0066217 A1 | 3/2011 | Diller et al. |
| 2013/0120760 A1 | 5/2013 | Raguin et al. |
| 2017/0214839 A1 | 7/2017 | Keller et al. |
| 2021/0199550 A1 | 7/2021 | Urey et al. |
| 2022/0069537 A1 | 3/2022 | Travers et al. |

FOREIGN PATENT DOCUMENTS

| | | |
|---|---|---|
| WO | 2023183493 A2 | 9/2023 |
| WO | 2023183493 A3 | 11/2023 |

OTHER PUBLICATIONS

Application No. PCT/US2023/016088 , "Invitation to Pay Additional Fees and, Where Applicable, Protest Fee", Jun. 22, 2023, 2 pages.
U.S. Appl. No. 18/125,639, "Non-Final Office Action", Nov. 4, 2024, 17 pages.
PCT/US2023/015178, "International Preliminary Report on Patentability", Sep. 26, 2024, 6 pages.
PCT/US2023/016088, "International Preliminary Report on Patentability", Oct. 10, 2024, 6 pages.
U.S. Appl. No. 18/125,633, "Notice of Allowance", Apr. 24, 2025, 10 pages.
U.S. Appl. No. 18/125,639, "Final Office Action", Feb. 21, 2025, 17 pages.

* cited by examiner

METHODS AND SYSTEMS FOR ALIGNMENT AND POSITIONING OF OPTICAL FIBERS

CROSS-REFERENCES TO RELATED APPLICATIONS

This application claims the benefit of priority to U.S. Provisional Patent Application No. 63/320,027, filed Mar. 15, 2022, entitled "METHODS AND SYSTEMS FOR ALIGNMENT AND POSITIONING OF OPTICAL FIBERS," the entire contents of which are hereby incorporated by reference for all purposes.

BACKGROUND OF THE INVENTION

Polarization maintaining fibers have structures that support propagation of light in predetermined polarizations. When polarization maintaining fibers are spliced together or bonded to optical elements, the polarization maintaining fibers may be positioned and aligned for splicing and/or bonding.

Despite the progress made in the area of polarization maintaining fibers, there is a need in the art for improved methods and systems related to aligning and positioning an optical fiber.

SUMMARY OF THE INVENTION

The present disclosure relates generally to methods and systems related to optical systems including polarization maintaining fibers. More particularly, embodiments of the present invention provide methods and systems that can be used for aligning and positioning of an optical fiber. The disclosure is applicable to a variety of applications in lasers and optics, including fiber laser implementations.

During the alignment and/or bonding process, an axial load may be applied to the optical fiber. For example, the optical fiber may be pressed against a bonding component. Using conventional alignment and bonding systems and techniques, the axial loading on the optical fiber often causes axial movement of the optical fiber, which can negatively impact the alignment and/or bonding process. Accordingly, embodiments of the present invention provide methods and systems related to aligning and positioning an optical fiber.

An optical fiber alignment and positioning system is provided herein. The optical fiber alignment and positioning system may include a vacuum stage having a first end and a second end. The vacuum stage may include a vacuum inlet operable to be in fluid communication with a vacuum source and one or more passages extending through the vacuum stage. The one or more passages may be in fluid communication with a plurality of vacuum ports.

The vacuum stage may include an optical fiber channel. The optical fiber channel may extend from the first end of the vacuum stage to the second end of the vacuum stage. The plurality of vacuum ports may pass through the optical fiber channel. The optical fiber channel may include a first wall and a second wall. For example, the optical fiber channel may include a v-groove formed by the first wall and the second wall. The plurality of vacuum ports may pass through the first wall and the second wall. The plurality of vacuum ports may be configured to pull vacuum on an optical fiber disposed within the optical fiber channel.

The first wall and the second wall may include a directional friction surface. The directional friction surface may include a first friction factor in a first direction and a second friction factor in a second direction. The directional friction surface may contact at least a portion of the optical fiber and may allow for movement of the optical fiber in the second direction but resists movement of the optical fiber in the first direction. For example, the first direction may be an axial direction and the second direction may be a rotational direction.

The first friction factor may be higher than the second friction factor. In some embodiments, the directional friction surface may include a directional friction coating. The directional friction coating may be coated onto the first wall and the second wall of the optical fiber channel. In some embodiments, the directional friction surface may include a directional microstructure. The directional microstructure may include a pattern of frictional lines. The frictional lines may include the first friction factor. In some embodiments, the directional microstructure may include a composite material. In other embodiments, the directional friction surface may include a first material having embedded particulates.

The optical fiber alignment and positioning system may also include an image sensor positioned to generate an image of an emission face of an optical fiber disposed within the optical fiber channel. In some embodiments, the optical fiber alignment and positioning system may include a mechanical immobilizer. The mechanical immobilizer may be configured to secure an optical fiber disposed in the optical fiber channel. In some embodiments, the mechanical immobilizer may be positioned between the first end of the vacuum stage and the image sensor.

A method for aligning and positioning an optical fiber is provided herein. The method may include providing an optical fiber alignment and positioning system. The optical fiber alignment and positioning system may include a vacuum stage. The vacuum stage may include a first end and a second end. The vacuum stage may include an optical fiber channel. The optical fiber channel may extend from the first end of the vacuum stage to the second end of the vacuum stage. The plurality of vacuum ports may pass through the optical fiber channel. The optical fiber channel may include a first wall and a second wall. For example, the optical fiber channel may include a v-groove formed by the first wall and the second wall. The plurality of vacuum ports may pass through the first wall and the second wall. The plurality of vacuum ports may be configured to pull vacuum on an optical fiber disposed within the optical fiber channel.

The first wall and the second wall may include a directional friction surface. The directional friction surface may include a first friction factor in a first direction and a second friction factor in a second direction. The directional friction surface may contact at least a portion of the optical fiber and may allow for movement of the optical fiber in the second direction but resists movement of the optical fiber in the first direction. For example, the first direction may be an axial direction and the second direction may be a rotational direction. In such an example, modifying the position of the optical fiber by moving the optical fiber in the second direction to the modified position may include rotating the optical fiber in the rotational direction to the modified position.

The first friction factor may be higher than the second friction factor. In some embodiments, the directional friction surface may include a directional friction coating. The directional friction coating may be coated onto the first wall and the second wall of the optical fiber channel. In some embodiments, the directional friction surface may include a directional microstructure. The directional microstructure may include a pattern of frictional lines. The frictional lines may include the first friction factor. In some embodiments, the directional microstructure may include a composite material. In other embodiments, the directional friction surface may include a first material having embedded particulates.

The method may also include placing an optical fiber in the optical fiber channel such that at least a portion of the optical fiber is in contact with the directional friction surface. The method may include modifying a position of the optical fiber by moving the optical fiber in the second direction to a modified position. The method may include determining an alignment offset and comparing the alignment offset to an alignment threshold. In some embodiments, the method may include applying a vacuum to a portion of the optical fiber. The vacuum may be applied via the plurality of vacuum ports to the portion of the optical fiber.

In some embodiments, after determining the alignment offset is within the alignment threshold, the method may include closing a mechanical immobilizer about a portion of the optical fiber to immobilize the optical fiber, and after aligning the optical fiber with a component, opening the mechanical immobilizer about the optical fiber to release the optical fiber. The method may also include determining that the alignment offset is within the alignment threshold and attaching a first end of the optical fiber to a component. For example, securing the first end of the optical fiber to the component may include bonding the first end of the optical fiber to the component. In some embodiments, the method may include determining that the alignment offset is not within the alignment threshold, modifying the optical fiber to a further modified position by moving the optical fiber in the second direction, determining a second alignment offset, determining the second alignment offset is within the alignment threshold, and securing a first end of the optical fiber to a component.

Numerous benefits are achieved by way of the present invention over conventional techniques. For example, embodiments of the present invention provide methods and systems that can align and position optical fibers, including polarization maintaining fibers, during fiber bonding processes. These and other embodiments of the disclosure, along with many of its advantages and features, are described in more detail in conjunction with the text below and corresponding figures.

DETAILED DESCRIPTION OF SPECIFIC EMBODIMENTS

The present disclosure relates generally to methods and systems related to optical systems including polarization maintaining fibers. More particularly, embodiments of the present invention provide methods and systems that can be used for aligning and positioning of an optical fiber. The disclosure is applicable to a variety of applications in lasers and optics, including fiber laser implementations.

During alignment and bonding processes of an optical fiber, an optical fiber may be held or secured in a desired position. To hold the optical fiber in the desired position, the optical fiber may be held by one side. The optical fiber must also be easily released from the desired position without impacting the position of the optical fiber. Common means of holding the optical fiber in a desired position that allow for easy release of the optical fiber include vacuum or clamping mechanisms.

Current vacuum or clamping mechanisms, however, do not allow for high axial loads to be applied to the optical fiber without slippage (e.g., movement of the optical fiber). For example, during an alignment and bonding process, the optical fiber may be pressed against a bonding component. The axial load on the optical fiber caused by the pressure against the bonding component may cause the optical fiber to slip axially away from the bonding component. Movement of the optical fiber under axial loading can negatively impact the alignment and/or bonding process. While the securing mechanism applied to the optical fiber, such as vacuum applied from a vacuum source or pressure applied by a clamp, could be increased, the increase can cause deformation of the optical fiber. Deformation can cause the optical fiber to bend or kink, thereby affecting the angle or emittance characteristics of light from the optical fiber. Accordingly, there is a need in the art for improved methods and systems related to alignment and positioning of an optical fiber.

Figure 1:
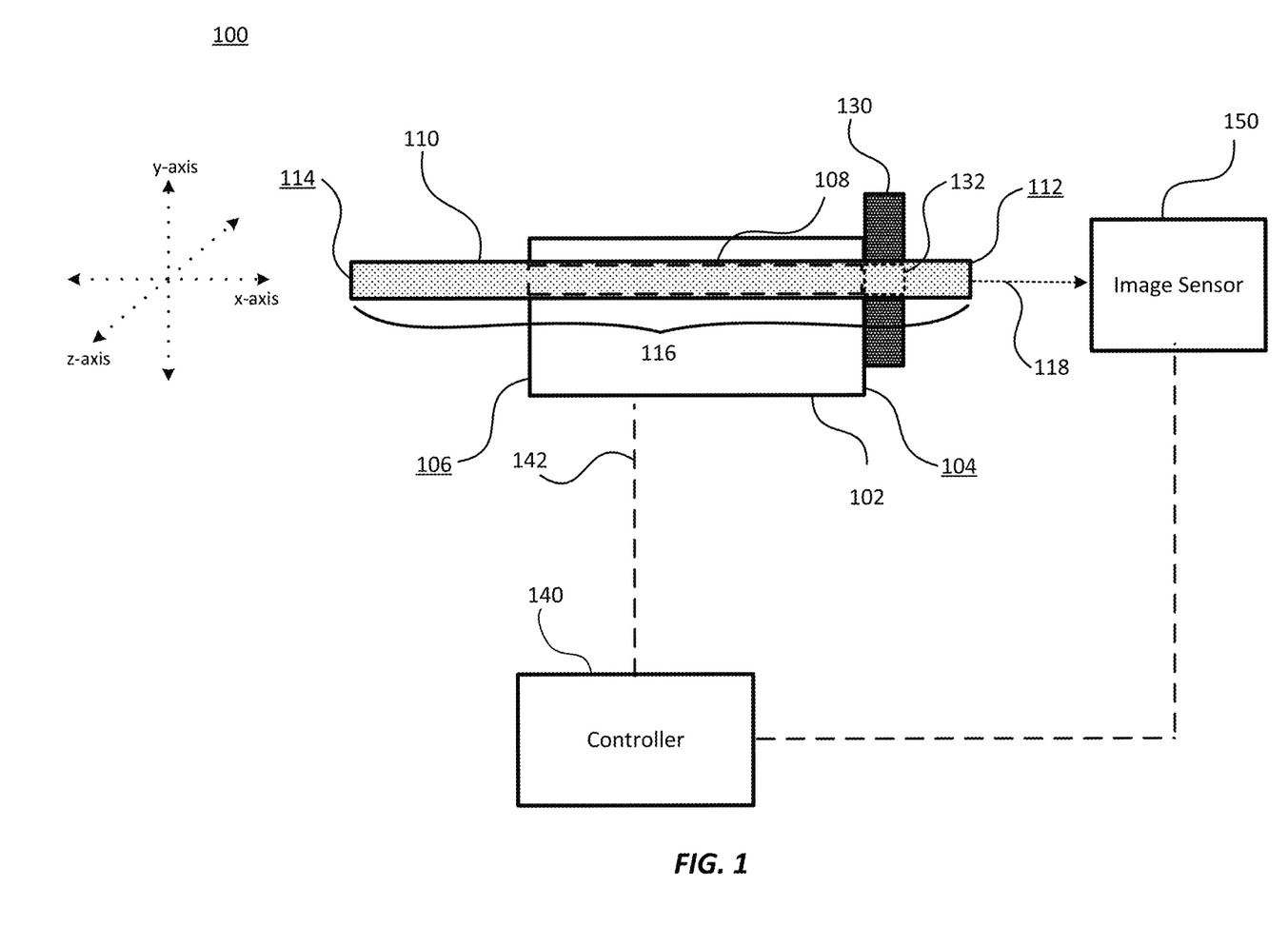
FIG. 1 is a simplified schematic diagram of an optical fiber alignment and positioning system according to an embodiment of the present invention.

FIG. 1 is a simplified schematic diagram of an optical fiber alignment and positioning system 100 according to an embodiment of the present invention. The optical fiber alignment and positioning system 100 may be used to position and align a polarization maintaining fiber, such as optical fiber 110, with one or more external bodies (e.g., another optical fiber, a microlens array, and the like). As shown, the optical fiber 110 may include a first end 112 and a second end 114 extending axially along an x-axis. The optical fiber alignment and positioning system 100 may be used to align and position the first end 112 of the optical fiber with one or more external bodies.

To align the optical fiber 110 with an external body, it may be desirable to maintain the polarization of the light output by the optical fiber 110 with respect to the external body. For example, optical fibers are often spliced to various external bodies, such as another optical fiber or a piece of optical equipment, and precise alignment between the optical fiber and the external body is utilized to maintain the polarization state of the light in the external body. One method of maintaining the polarization of the light output between the optical fiber 110 and the external body is to align the internal components (e.g., stress rods, core, microstructure, and the like) of the optical fiber 110 with one or more components of the external body. Thus, proper alignment of the optical fiber 110 often utilizes precise alignment and positioning of the internal components of the optical fiber 110.

During an alignment process or an attachment process, an axial load or pressure may be applied to the first end 112 of the optical fiber 110. For example, the first end 112 of the optical fiber 110 may be pressed against an external body, or the external body may be pressed against the first end 112 of the optical fiber 110. To prevent the optical fiber 110 from moving during the alignment and/or attachment process, the optical fiber alignment and positioning system 100 may include a vacuum stage. The vacuum stage 102 may include a first end 104 and a second end 106. The vacuum stage 102 may be configured to receive an optical fiber 110. For example, the vacuum stage 102 may include an optical fiber channel 108. The optical fiber channel 108 may extend from the first end 104 to the second end 106 of the vacuum stage 102. The optical fiber channel 108 may be configured to receive the optical fiber 110. The optical fiber 110 may be disposed in the optical fiber channel 108 such that a portion of length 116 of the optical fiber 110 contacts the optical fiber channel 108. The vacuum stage 102, including the optical fiber channel 108, is described in greater detail with respect to FIGS. 2 and 3.

In some embodiments, the optical fiber alignment and positioning system 100 may also include a mechanical immobilizer 130. The mechanical immobilizer 130 may be part of the vacuum stage 102 or may be separate from the vacuum stage 102. The mechanical immobilizer 130 may be positioned to contact a portion 132 of optical fiber 110 that cantilevers out of the optical fiber channel 108 towards an image sensor 150. In some embodiments, the mechanical immobilizer 130 may be positioned between the vacuum stage 102 and the second end 114 of the optical fiber 110, while in other embodiments, the mechanical immobilizer 130 may be positioned between the vacuum stage 102 and the image sensor 150, as shown. The position of the mechanical immobilizer 130 may vary depending on the application.

The mechanical immobilizer 130 may be configured to securely hold the optical fiber 110 during the alignment and attachment processes. For example, the mechanical immobilizer 130 may include two pads positioned on either side of optical fiber 110 that may contact optical fiber 110 along portion 132. The location of the portion 132 at which the mechanical immobilizer 130 contacts the optical fiber 110 may vary depending on the positioning of the mechanical immobilizer 130, as noted above. The mechanical immobilizer 130 may be configured to secure optical fiber 110 in a fixed relationship with respect to the vacuum stage 102.

When disposed on the vacuum stage 102, the optical fiber 110 may be positioned such that the first end 112 is directed towards the image sensor 150. In some embodiments, the optical fiber 110 may emit a light beam 118 from the first end 112. The first end 112 of the optical fiber 110 may be a cleaved end of the optical fiber 110. The image sensor 150 may be positioned to receive at least a portion of the light beam 118 as emitted from the optical fiber 110. For example, the image sensor 150 may be positioned in axial alignment with the first end 112 of the optical fiber 110. The light beam 118 may be light that is emitted from the optical fiber 110 when light propagates through the length 116 of the optical fiber 110. For example, a light source (not shown), such as a laser, may be directed toward the second end 114 or along the length 116 of the optical fiber 110 to generate the light beam 118.

The image sensor 150 may be used to identify one or more internal components of the optical fiber 110. As such, the image sensor 150 may be positioned to generate an image of an emission face of the optical fiber 110. For example, the emission face of optical fiber 110 may be the first end 112 of the optical fiber 110. To generate an image of the emission face of the optical fiber 110, the image sensor 150 may include any sensor capable of sensing the light beam 118 when emitted from the first end 112 of the optical fiber 110. In an example embodiment, the image sensor 150 may be a camera. As noted herein, identification of the internal components, such as stress rods and/or core, of the optical fiber 110 may be used for alignment and positioning processes. For example, based on an image captured by the image sensor 150, an alignment offset for the optical fiber 110 may be determined. The alignment offset may be the difference between the position of the emission face of the optical fiber 110 and an alignment position. The alignment position may be a position of the emission face of the optical fiber 110 at which the emission face aligns with an external body.

In some embodiments, the optical fiber alignment and positioning system 100 may also include a controller 140. The controller 140 may be operationally coupled with the vacuum stage 102 via communication line 142. In some embodiments, the controller 140 may also be operationally coupled with image sensor 150 and/or the mechanical immobilizer 130. For example, after the image sensor 150 generates an image of the emission face of the optical fiber 110, the image sensor 150 may send the image to the controller 140. The controller 140 may perform various steps of the methods described herein. For example, the controller 140 may determine one or more modifications to the position of the optical fiber 110 based on the image captured by the image sensor 150. In such an example, based on this determination, the controller 140 may send instructions to the vacuum stage 102 to release vacuum from the optical fiber 110. As will be described in greater detail below, after the vacuum is released, a position of the optical fiber 110 may be modified or adjusted.

The optical fiber alignment and positioning system 100 and related methods described herein may also be used for other types of fibers and/or configuration of stress rods and cores of fibers. In various embodiments, the optical fiber alignment and positioning system may be another type of alignment system such as for bow-tie fibers, panda fibers, multi-core fibers, elliptical fibers, photonic crystal optical fibers, and the like.

Figure 2:
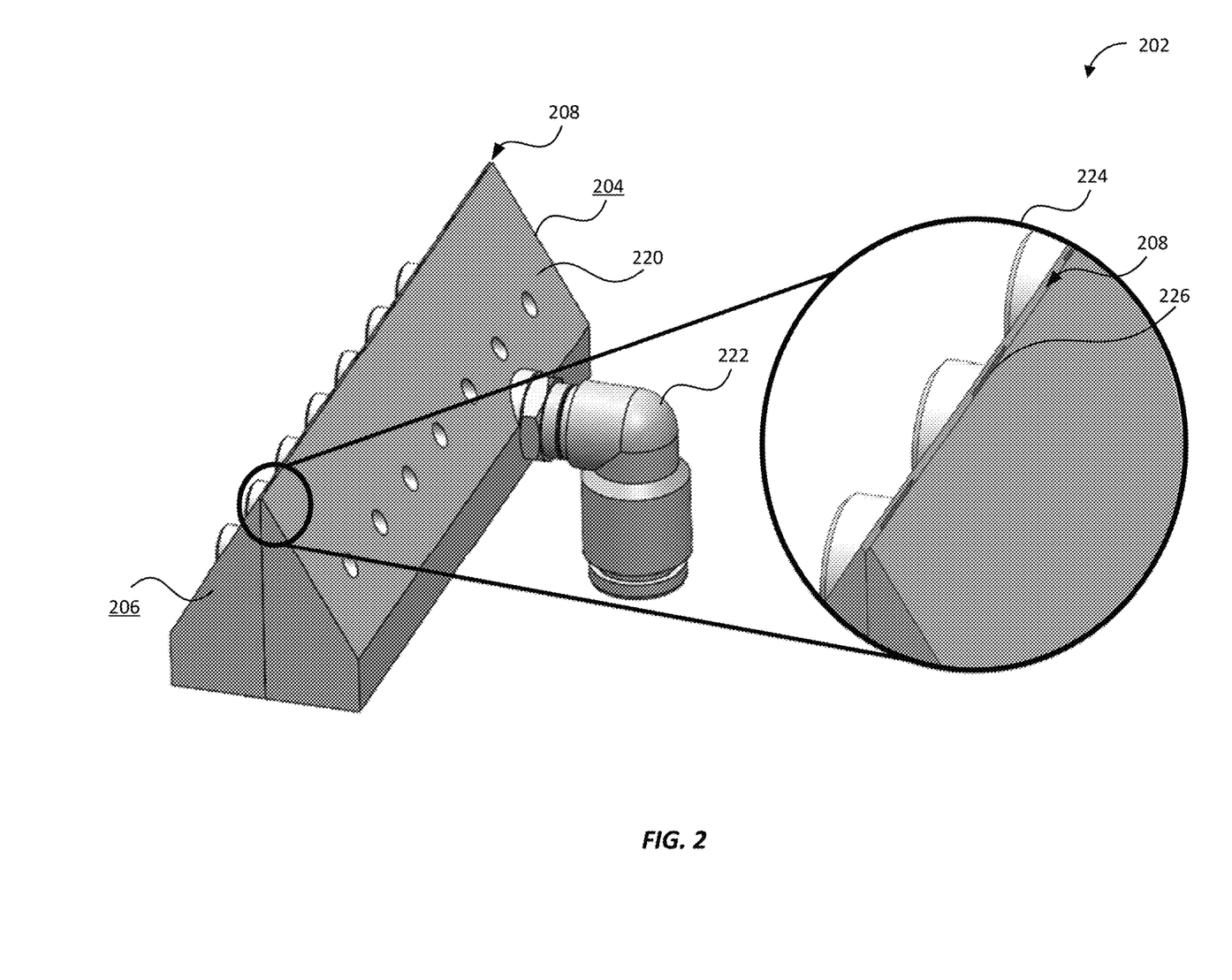
FIG. 2 is a simplified schematic diagram of a vacuum stage for the optical fiber alignment and positioning system illustrated in FIG. 1 according to an embodiment of the present invention.

FIG. 2 is a simplified schematic diagram of a vacuum stage 202 for the optical fiber alignment and positioning system 100 illustrated in FIG. 1, according to an embodiment of the present invention. The vacuum stage 202 may be the same or similar to the vacuum stage 102 illustrated in FIG. 1. The vacuum stage 202 may be part of an optical fiber alignment and positioning system, such as the optical fiber alignment and positioning system 100.

The vacuum stage 202 may include a body 220. An optical fiber channel 208 may be formed as part of the body 220. The optical fiber channel 208, which may be the same or similar to the optical fiber channel 108, may extend from a first end 204 to a second end 206 of the body 220 of the vacuum stage 202. The optical fiber channel 208 may be configured to receive an optical fiber, such as the optical fiber 110 illustrated in FIG. 1.

The vacuum stage 202 may be configured to apply a vacuum to a portion of the optical fiber 110. For example, a vacuum may be applied to the portion of the optical fiber 110 that is disposed in the optical fiber channel 208. To apply vacuum, the vacuum stage 202 may include a vacuum inlet 222. The vacuum inlet 222 may be operable to be in fluid communication with a vacuum source (not shown). When in fluid communication with a vacuum source, vacuum may be drawn via the vacuum inlet 222.

View 224 illustrates a close-up view of the optical fiber channel 208. As shown, the optical fiber channel 208, may include at least two walls. For example, the optical fiber channel 208 may be formed in the shape of a v-groove. The optical fiber channel 208 is discussed in greater detail with respect to FIGS. 4A-C.

To apply vacuum to the portion of the optical fiber disposed in the optical fiber channel 208, the optical fiber channel 208 may include a plurality of vacuum ports 226. The vacuum ports 226 may extend along a predefined portion of the optical fiber channel 208 between the first end 204 and the second end 206 of the vacuum stage 202. For example, the vacuum ports 226 may extend a predetermined unit of length (e.g., 2-25 mm) along the optical fiber channel 208 between the first end 204 and the second end 206. In some embodiments, the vacuum ports 226 may pass through one or more walls of the optical fiber channel 208. For example, if the optical fiber channel 208 is a v-groove, then the vacuum ports 226 may pass through the first and second walls of the v-groove.

The vacuum ports 226 may be in fluid communication with one or more passages (not shown) extending through the body 220 of the vacuum stage 202. The one or more passages may be in fluid connection with the vacuum inlet 222 such to extend the vacuum from the vacuum inlet 222 to the vacuum ports 226.

As noted above, a vacuum may be applied to an optical fiber disposed in the optical fiber channel 208. For example, a vacuum force or vacuum pressure may be applied to the optical fiber disposed in the optical fiber channel 208 via the plurality of vacuum ports 226. The size of an individual vacuum port (e.g., length and width) may vary depending on the diameter of the optical fiber disposed in the optical fiber channel 208. Additionally, the size and number of the vacuum ports 226 may impact the size of the vacuum stage 202. For example, increasing the length or the number of vacuum ports may increase the size and weight of the vacuum stage 202, and in some cases, decrease the structural rigidity of the vacuum stage 202.

By applying a vacuum to the optical fiber, the optical fiber may be held in the optical fiber channel 208 by frictional forces. The following equation characterizes the force holding the optical fiber in the optical fiber channel 208, where F is the frictional force applied to the optical fiber, p is the coefficient of friction, also referred to as a friction factor herein, and N is the normal force applied by the vacuum to the optical fiber.

$$F = \mu N$$

The normal force, N, may be controlled by vacuum pressure applied to the optical fiber by the vacuum ports 226. For example, the normal force, N, may be characterized by the following equation.

$$N = P_{vac} n A_{port}$$

As shown, the design of the vacuum ports 226 and the pressure applied by the vacuum ports 226 to the optical fiber may impact the frictional force holding the optical fiber in place. In the above equation for the normal force, N, $P_{vac}$ is the vacuum pressure (force/area) that is applied to the optical fiber, n is the number of vacuum ports 226, and $A_{port}$ is the cross-sectional area of the vacuum ports 226.

Figure 3:
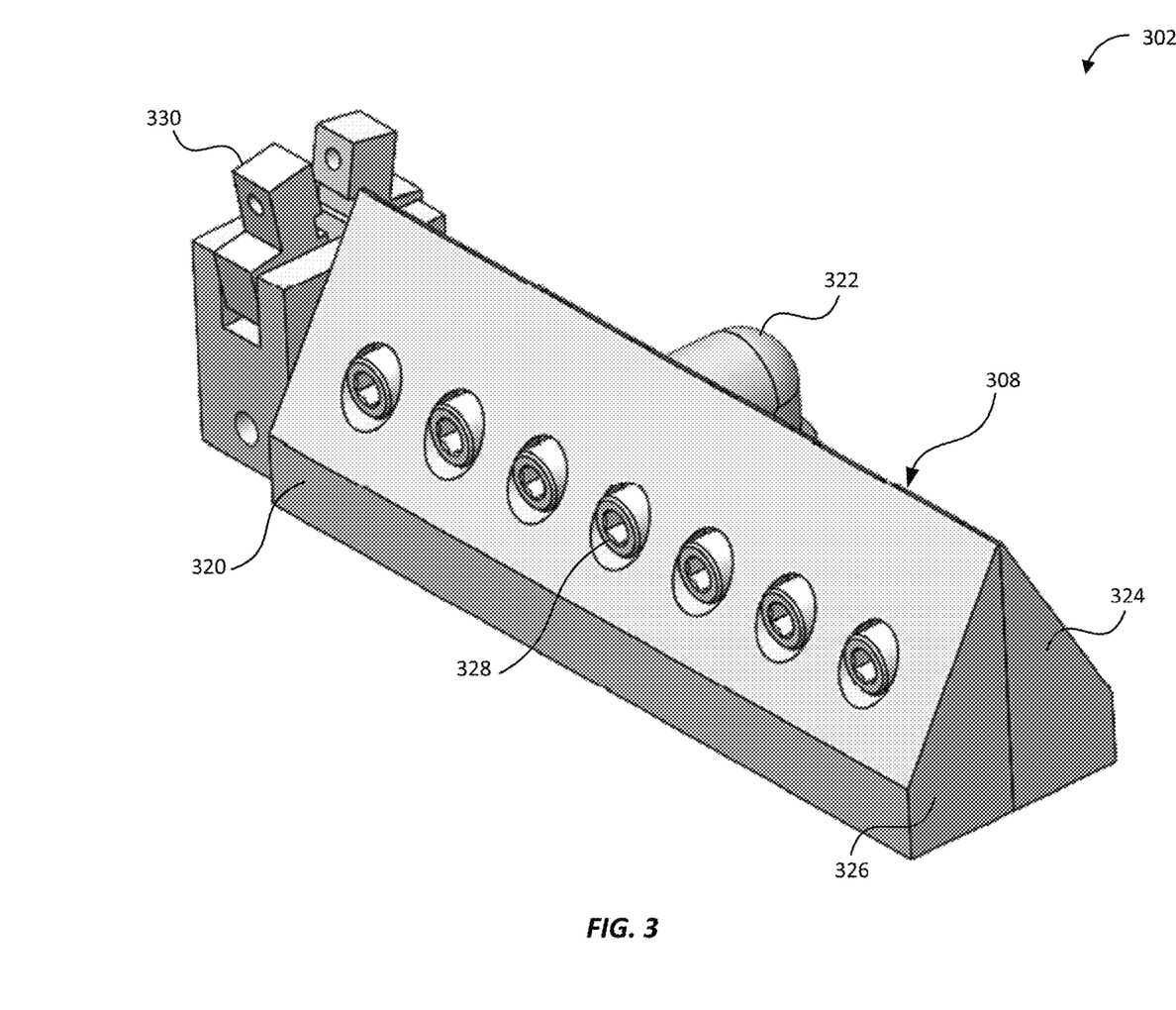
FIG. 3 is a simplified schematic diagram of a vacuum stage for the optical fiber alignment and positioning system illustrated in FIG. 1 having a mechanical immobilizer according to an embodiment of the present invention.

FIG. 3 is a simplified schematic diagram of a vacuum stage for the optical fiber alignment and positioning system illustrated in FIG. 1 having a mechanical immobilizer, according to an embodiment of the present invention. Referring to FIG. 3, a vacuum stage 302 is illustrated that can be utilized with the optical fiber alignment and positioning system 100 illustrated in FIG. 1 and has a mechanical immobilizer. The vacuum stage 302 may be the same or similar to the vacuum stage 202 and may be used as part of the optical fiber alignment and positioning system 100 as illustrated in FIG. 1. The following discussion is made with reference to FIGS. 1 and 2; however, it should be understood that any systems or techniques described herein may apply.

As shown in FIG. 1, in some embodiments, the optical fiber alignment and positioning system 100 may include a mechanical immobilizer 130. The mechanical immobilizer 330 illustrated in FIG. 3 may be the same or similar to the mechanical immobilizer 130. In some embodiments, the mechanical immobilizer 330 may be part of the body 320 of the vacuum stage 302, while in other embodiments the mechanical immobilizer 330 may be separate from the body 320 of the vacuum stage 302. As discussed above, the mechanical immobilizer 330 may be configured to secure an optical fiber, such as the optical fiber 110 illustrated in FIG. 1, when disposed in an optical fiber channel 308. The optical fiber channel 308 may be the same or similar to the optical fiber channel 108 and/or optical fiber channel 208.

Similar to the vacuum stage 202, the vacuum stage 302 may be operationally configured to apply a vacuum to an optical fiber when disposed in the optical fiber channel 308. To connect the body 320 of the vacuum stage 302 with a vacuum source, the vacuum stage 302 may include a vacuum inlet 322.

FIG. 3 also illustrates that the body 320 of the vacuum stage 302 may be composed of two main components. As shown, the body 320 may include a first portion 324 and a second portion 326. The first portion 324 and the second portion 326 may be secured today by a plurality of attachment mechanisms 328. In an example embodiment, the attachment mechanisms 328 may be screws however, those skilled in the art would readily appreciate the various attachment means that could be used to secure the first portion 324 to the second portion 326. In the illustrated embodiment, the optical fiber channel 308 may be formed by the first portion 324 and the second portion 326. For example, a first side of the optical fiber channel 308 may be formed from the first portion 324 and a second side of the optical fiber channel 308 may be formed from the second portion 326. Thus, when the first portion 324 and the second portion 326 are secured together, the optical fiber channel 308 is formed therewith.

Figure 4A:
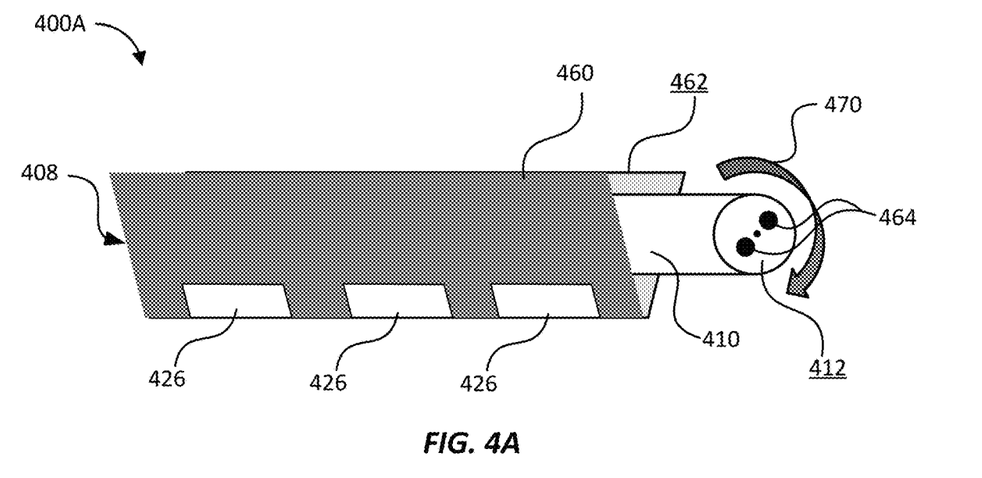
FIGS. 4A-C are simplified schematic diagrams of an optical fiber channel having an optical fiber disposed therein according to an embodiment of the present invention.
Figure 4B:
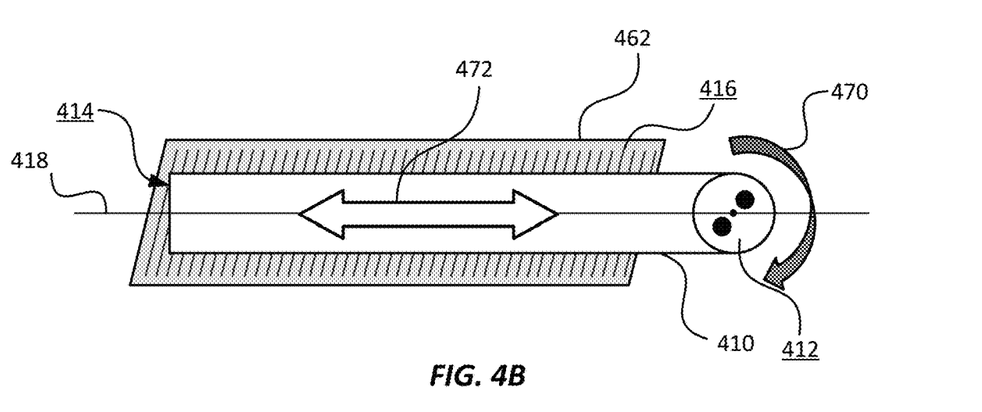
Figure 4C:
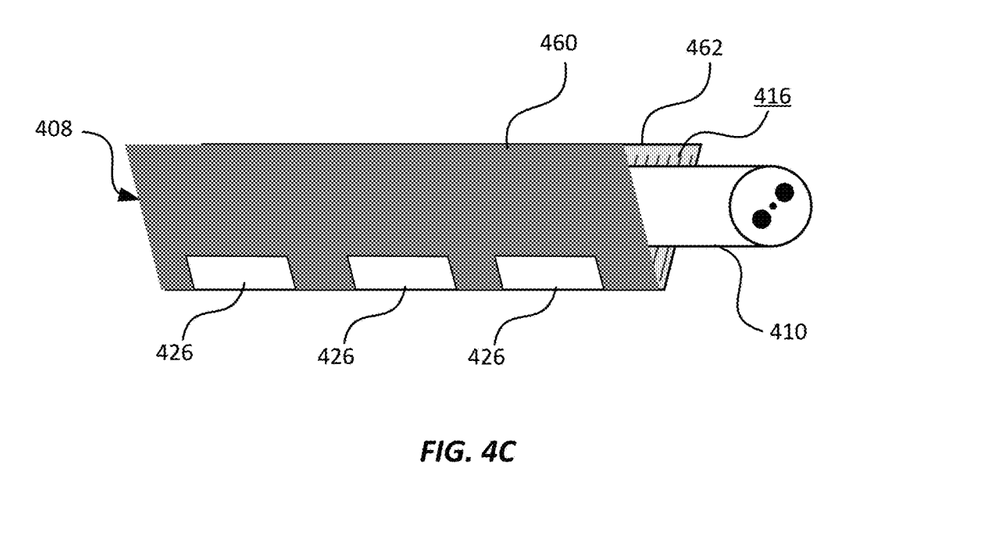

FIGS. 4A-C are simplified schematic diagrams of an optical fiber channel 408 having an optical fiber disposed therein, according to an embodiment of the present invention. For ease of discussion, FIGS. 4A-C are discussed with respect to FIGS. 1-3; however, it should be understood that any system or technique described herein may be applicable.

FIG. 4A illustrates an embodiment 400A in which an optical fiber 410 is disposed within the optical fiber channel 408. The optical fiber channel 408 may be the same or similar to the optical fiber channel 108, the optical fiber channel 208, or optical fiber channel 308. For example, the optical fiber channel 408 may be an optical fiber channel within the optical fiber alignment and positioning system 100. The optical fiber channel 408 may be configured to receive and hold the optical fiber 410. The optical fiber 410 may be the same or similar to the optical fiber 110.

In some embodiments, the optical fiber channel 408 may be a v-groove. As such, the optical fiber channel 408 may include a first wall 460 and a second wall 462. As described above with respect to FIG. 3, in some embodiments, the first wall 460 may be formed as part of a first portion 324 of the body 320 of the vacuum stage 302, and the second wall 462 may be formed as part of the second portion 326 of the body 320 of the vacuum stage 302. In other embodiments, the optical fiber channel 408, including the first wall 460 and the second wall 462, may be separate from the body 320 of the vacuum stage 302. As noted above with respect to FIG. 2, the optical fiber channel 408 may include a plurality of vacuum ports 426. When the optical fiber channel 408 is a v-groove, then the plurality of vacuum ports 426 may pass through a portion of the first wall 460 and/or a portion of the second wall 462.

When the optical fiber 410 is disposed in the optical fiber channel 408, the optical fiber 410 may be rotated along a rotational direction 470. The rotational direction 470 may be about an x-axis or length of the optical fiber 410. For example, during an alignment process, one or more internal components 464 exposed via first end 412 of the optical fiber 410 may be aligned with an external body. The internal components 464 may be exposed via first end 412 because the first end 412 may be a cleaved end of the optical fiber 410. In some embodiments, the internal components 464 may be exposed on the first end 412 by removing a jacket or coating applied to the optical fiber 410. As illustrated, the internal components 464 of the optical fiber 410 may include stress rods. Other internal components 464 may include a core or a microstructure.

To align the internal components 464 with an external body, rotation of the optical fiber 410 along the rotational direction 470 may be utilized. As illustrated by FIG. 4B, when rotating the optical fiber 410 along the rotational direction 470, the optical fiber 410 may move axially along an axial direction 472. The axial direction 472 may extend along an axis 418 of the optical fiber. The axis 418 may extend from the first end 412 of the optical fiber 410 to a second end 414 of the optical fiber 410.

During an alignment, positioning, or an attachment process, it may be undesirable for the optical fiber 410 to move along the axial direction 472. For example, if the optical fiber 410 moves along the axial direction 472 during an alignment process, the first end 412 of the optical fiber 410 may no longer be in a correct alignment position with an external body. Another example involves an attachment process in which the first end 412 of the optical fiber is pressed against an external body for bonding. In such an example, if the optical fiber 410 moves along the axial direction 472 during the bonding process, the bond between the first end 412 and the external body may not completely form or even fail if the optical fiber 410 moves axially away from the external body along the axial direction 472.

In some implementations, to combat movement of the optical fiber 410 along the axial direction 472, additional pressure may be applied to the optical fiber 410 in a direction perpendicular to the axial direction 472. For example, some methods may include increasing a vacuum pressure applied to the optical fiber 410 or applying a clamp to sides of the optical fiber 410 to prevent axial movement. These methods, however, can impact the accuracy of the alignment and positioning process. For example, increasing pressure applied to the optical fiber 410 by the vacuum or a clamp to reduce axial movement can impede movement of the optical fiber 410 in the rotational direction 470. Rotating the optical fiber 410 along the rotational direction 470 is generally utilized during the alignment process, thus impeding this movement can negatively impact the accuracy of an alignment process.

In addition to impeding movement in the rotational direction 470, some methods of applying additional pressure to the optical fiber 410 may cause deformation of the optical fiber 410 along its length. For example, returning to FIG. 2, if the vacuum pressure applied to an optical fiber disposed in the optical fiber channel 208 is increased to prevent movement of the optical fiber in the axial direction 472, the additional pressure applied to the portions of the optical fiber disposed over the vacuum ports 226 may cause deformation or bending of the optical fiber at those portions. Any bending or deformation of the optical fiber can negatively impact the accuracy of the alignment process because after the pressure, vacuum or otherwise, is released, the optical fiber may return to a previous state, thereby ending in a position different than the position used for alignment. Additional issues caused by increasing the vacuum pressure applied to the optical fiber 410 can include sticking or adhesion of the optical fiber 410 in the optical fiber channel 408 due to unreleased pressure.

To provide an optical fiber channel 408 that allows the optical fiber 410 to move in the rotational direction 470 while preventing or minimizing movement in the axial direction 472, a directional friction surface 416 is provided herein. The directional friction surface 416 may be characterized by a plurality of friction factors (e.g., friction coefficients). For example, the directional friction surface 416 may be characterized by a first friction factor and a second friction factor. In other words, the directional friction surface 416 may be characterized by a first friction coefficient for friction measured in a first direction and a second friction coefficient for friction measured in a second direction. The first friction factor may be oriented in a first direction such as to provide a frictional force against movement in the first direction. The second friction factor may be oriented in a second direction such as to provide a frictional force against movement in the second direction. The first direction and the second direction may be different directions. In an example embodiment, the first direction may be the axial direction 472 and the second direction may be the rotational direction 470. Thus, the second direction can be a circumferential direction (i.e., a tangential direction) oriented 90° to the first direction.

To reduce movement of the optical fiber 410 in the axial direction 472, the first friction factor corresponding to the directional friction surface 416 may be greater than the second friction factor. Because the first friction factor is greater than the second friction factor in this example, the frictional force applied to the optical fiber 410 in the axial direction 472 may be greater than the frictional force applied to the optical fiber 410 in the rotational direction 470. This may allow the optical fiber 410 to rotate in the rotational direction 470, while preventing or minimizing movement of the optical fiber 410 in the axial direction 472.

The directional friction surface may contact at least a portion of the optical fiber 410. For example, the directional friction surface may contact the portion of the optical fiber 410 that is disposed within the optical fiber channel 408. As shown by FIG. 4C, the internal walls, such as the first wall 460 and the second wall 462, may include the directional friction surface 416. When the optical fiber channel 408 is not a v-groove, then one or more walls that form the optical fiber channel 408 may include the directional friction surface 416.

In some embodiments, the directional friction surface 416 may be part of the first wall 460 and the second wall 462, while in other embodiments, the directional friction surface 416 may be a coating or material applied to the first wall 460 and the second wall 462. For example, the directional friction surface 416 may be formed from the material of the first wall 460 and the second wall 462. As the first wall 460 and the second wall 462 are formed by the optical fiber channel 408, the directional friction surface 416 may be formed from the material of the optical fiber channel 408. With reference to FIG. 3, the optical fiber channel 308 may be formed by the first portion 324 and the second portion 326 of the body 320. In such examples, the directional friction surface 416 may be formed by the material of the first portion 324 and/or the second portion 326 of the body 320. In other words, the directional friction surface 416 may be formed by the material or as part of the vacuum stage 302.

In other embodiments, the directional friction surface 416 may be a coating that is applied to a surface of the optical fiber channel 408, such as the first wall 460 and the second wall 462 of the optical fiber channel 408. In other examples, the directional friction surface 416 may be a coating that is applied to a surface of vacuum stage 302.

The material forming the directional friction surface 416 may be a softer material than the material utilized for the first wall 460 and the second wall 462. For example, the directional friction surface 416 may be or include composite material. For example, the directional friction surface 416 may be or include a fiber glass or ceramic matrix composites containing soft polymer binders or polymer matrix composite. Conventionally, an optical fiber channel, such as the optical fiber channel 408, may be composed of a hard material, such as steel, to prevent deformation or decompression of the optical fiber 410 into the material of the optical fiber channel 408. Hard material, however, is often characterized by a single friction factor (e.g., friction coefficient), thereby allowing similar movement in both the axial direction 472 and the rotational direction 470. In contrast, the softer materials provided herein for the directional friction surface 416 may provide friction factor differences in the axial direction 472 and rotational direction 470. By providing the directional friction surface 416 with a first friction factor that is greater than a second friction factor, the directional friction surface 416 may limit movement in a first direction (e.g., axial direction 472), while allowing movement in the second direction (e.g., the rotational direction 470).

It should be understood that the arrangement of the first friction factor and the second friction factor on the directional friction surface 416 may vary depending on the desired movement of the optical fiber 410. For example, in certain applications, it may be advantageous to allow the optical fiber 410 to move in the axial direction 472 while limiting movement of the optical fiber 410 in the rotational direction 470. In such cases, the first friction factor may be less than the second friction factor. The direction, orientation, and arrangement of the first friction factor and the second friction factor may influence the directions in which movement of the optical fiber 410 is allowed and limited.

Figure 5A:
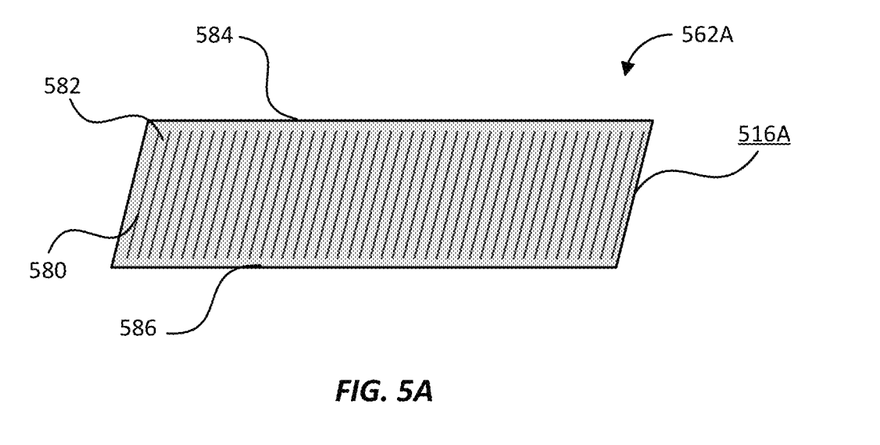
FIGS. 5A-C are simplified schematic diagrams illustrating a wall of an optical fiber channel having various directional friction surfaces according to an embodiment of the present invention.
Figure 5B:
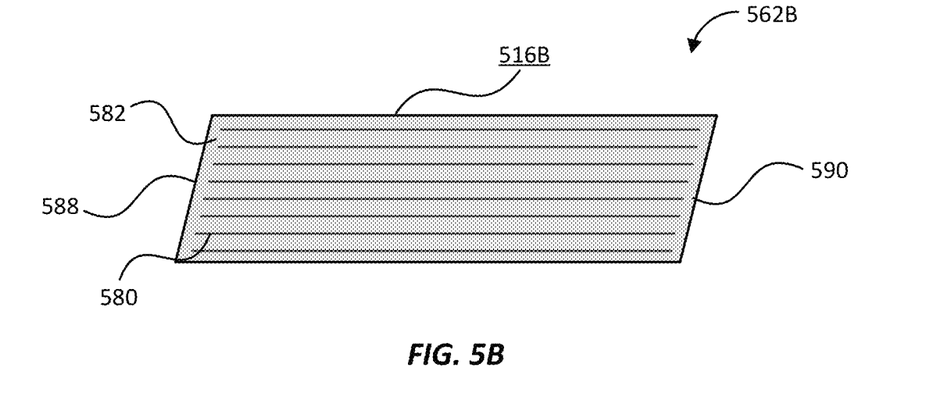
Figure 5C:
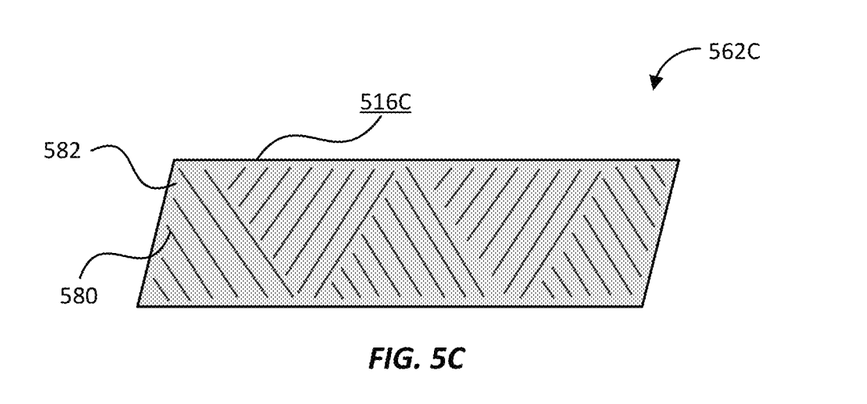

FIGS. 5A-C are simplified schematic diagrams illustrating a wall 562A, 562B, and 562C, respectively, of an optical fiber channel having various directional friction surfaces, according to an embodiment of the present invention. The walls 562A-C may be the same or similar to the first wall 460 from FIGS. 4A-C. For example, each of the walls 562A-C may be part of an optical fiber channel, such as the optical fiber channel 408.

Each of the walls 562A-C may include a directional friction surface 516A/516B/516C having a different arrangement of a first friction material 580 and a second friction material 582. The first friction material 580 may have a first friction factor and the second friction material 582 may have a second friction factor. As noted above, the first friction factor may be greater than the second friction factor; however, depending on the desired optical fiber movement, the first friction factor may be less than the second friction factor. To provide the directionalized movement of an optical fiber within the optical fiber channel, the first friction material 580 may form discrete lines or microstructures on or in the second friction material 582. For example, the first friction material may form a directional microstructure, such as a pattern of frictional lines.

As shown by FIG. 5A, a directional friction surface 516A may include the first friction material 580 and the second friction material 582. The first friction material 580 may form a pattern of frictional lines. The frictional lines formed by the first friction material 580 may extend perpendicular to the axial direction 472 illustrated by FIG. 4B. For example, the frictional lines formed by the first friction material 580 may extend from a top end 584 to a bottom end 586 of the optical fiber channel 408.

The wall 562B illustrated in FIG. 5B depicts a directional friction surface 516B having a different arrangement of the first friction material 580 and the second friction material 582. As shown, the first friction material 580 may be formed as frictional lines extending along the axial direction 472. For example, the frictional lines formed by the first friction material 580 may extend from a first side 588 of the wall 562B to a second side 590 of the wall 562B.

In some embodiments, the first friction material 580 may form a directional microstructure. For example, as illustrated by FIG. 5C, a directional friction surface 516C may include the first friction material 580 as a pattern of directional lines.

Although the first friction material 580 is illustrated as straight lines, it should be understood that curved lines are contemplated herein. Additionally, in some embodiments, the first friction material 580 may not be formed as a discrete line or structure from the second friction material 582. For example, in some embodiments, the first friction material 580 may be embedded particles within the second friction material 582. In an example embodiment, the directional friction surface 516A-C may be or include a glass embedded polymer, such as fiber glass or printed circuit board material.

As noted above, the directional friction surface 516A/516B/516C may be formed as part of the optical fiber channel, such as being formed from the material forming the walls 562A-C, or the directional friction surface 516A/516B/516C may be applied to the walls 562A-C, or a surface of the optical fiber channel, as a coating.

Figure 6:
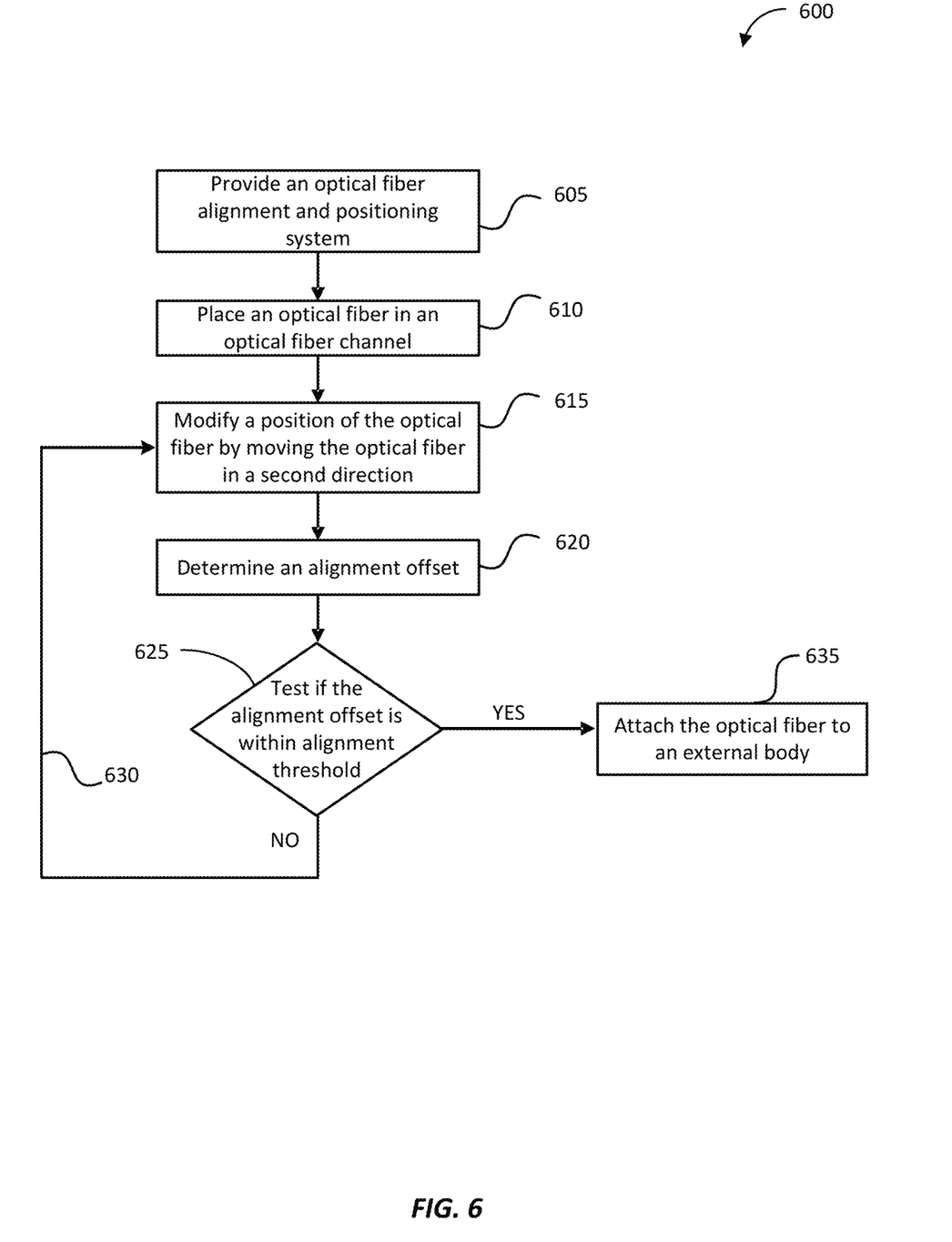
FIG. 6 is a simplified flowchart illustrating a method for aligning and positioning an optical fiber using an optical fiber alignment and positioning system according to an embodiment of the present invention.

FIG. 6 is a simplified flowchart illustrating a method 600 for aligning and positioning an optical fiber using an optical fiber alignment and positioning system according to an embodiment of the present invention. For example, the method 600 may be for aligning and positioning an optical fiber using the optical fiber alignment and positioning system 100. For ease of explanation, the following discussion is made with reference to FIGS. 1-5C; however, it should be understood that any system or technique discussed herein may be applicable to the method 600.

At step 605, the method 600 may include providing an optical fiber alignment and positioning system, such as the optical fiber alignment and positioning system 100 illustrated in FIG. 1. As illustrated in FIG. 1, the optical fiber alignment and positioning system 100 may include a vacuum stage 102 having a first end 112 and a second end 114. The vacuum stage 102 may include a vacuum inlet, such as the vacuum inlet 222, that is operable to be in fluid communication with a vacuum source. The vacuum stage 102 may also include one or more passages extending through the vacuum stage that are in fluid communication with a plurality of vacuum ports, such as the vacuum ports 226. The one or more passages may fluidly connect the plurality of vacuum ports with the vacuum source.

The vacuum stage 102 may also include an optical fiber channel, such as the optical fiber channel 108. The optical fiber channel 108 may extend from the first end 112 to the second end 114 of the vacuum stage 102. The plurality of ports may pass through the optical fiber channel 108. As discussed above, the optical fiber channel 108 may include a v-groove, such as the optical fiber channel 408 illustrated by FIG. 4A. In such embodiments, the optical fiber channel 108 may be formed by a first wall, such as the first wall 460, and a second wall, such as the second wall 462. When the optical fiber channel 108 includes a v-groove, the plurality of vacuum ports, such as the vacuum ports 426, may pass through the first wall 460 and the second wall 462, as illustrated in FIG. 4A.

In some embodiments, the optical fiber channel 108 may include a directional friction surface, such as the directional friction surface 416. For example, the first wall 460 and the second wall 462 of the optical fiber channel 408 may include the directional friction surface 416. The directional friction surface 416 may be formed as part of the optical fiber channel 108, while in other embodiments, the directional friction surface 416 may be a coating applied to a surface of the optical fiber channel 108.

The directional friction surface 416 may include a first friction factor in a first direction and a second friction factor in a second direction. In an example embodiment, the first friction factor may be higher than the second friction factor. As described above with respect to FIGS. 4A-C, the first direction may be an axial direction, such as the axial direction 472, and the second direction may be a rotational or tangential direction, such as the rotational direction 470. As illustrated by FIGS. 5A-C, the directional friction surface 516A/516B/516C may include a directional microstructure. For example, the directional friction surface 516A/516B/516C may include a pattern of frictional lines, such as those illustrated by FIGS. 5A-C. In other embodiments, the directional friction surface 516A/516B/516C may be formed by embedded particulates or grit.

The optical fiber channel 108 may be configured to receive at least a portion of an optical fiber, such as the optical fiber 110. As such, the method may include step 610. At step 610, the method 600 may include placing an optical fiber in the optical fiber channel. For example, the method 600 may include placing the optical fiber 410 in the optical fiber channel 408 such that at least a portion of the optical fiber 410 is in contact with the directional friction surface 416. In some embodiments, the method may include applying a vacuum to a portion of the optical fiber 110. For example, the vacuum may be applied via the plurality of vacuum ports 426 to the portion of the optical fiber 410.

At step 615, the method 600 may include modifying a position of the optical fiber 110 by moving the optical fiber 110 in the second direction to a modified position. For example, modifying the position of the optical fiber 110 by moving the optical fiber 110 in the second direction may include rotating the optical fiber 110 in a rotational direction to the modified position. With reference to FIG. 4A, the optical fiber 410 may be rotated in the rotation direction 470.

After modifying the position of the optical fiber 110 to the modified position, the mechanical immobilizer 130 may be opened to release the optical fiber 110.

At step 620, the method 600 may include determining an alignment offset for the optical fiber 110. The alignment offset may be an amount by which the optical fiber 110 is off from an alignment position with an external body. At step 625, the method may include determining if the alignment offset is within an alignment threshold. In some embodiments, the alignment threshold may vary depending on application. For example, in some applications, such as fusion splicing, the tolerance of the alignment threshold may be small, thereby allowing minimal variation between the position of the optical fiber 110 and the external body. In other applications, the tolerance of the alignment threshold may be larger, thereby allowing more flexibility with respect to the orientation of the optical fiber 110.

If at step 625, it is determined that the alignment offset of the optical fiber 110 is not within the alignment threshold, the method 600 may return to step 615 via iterative step 630. At step 615, the optical fiber 110 may be modified to a further modified position by moving the optical fiber in the second direction. After the optical fiber 110 is moved to the further modified position, a second alignment offset may be determined at step 620. At step 625, the second alignment offset may be compared to the alignment threshold.

If, at step 625, it is determined that the alignment offset of any iteration (e.g., first alignment offset, second alignment offset, etc.) is within the alignment threshold, then the method may continue to step 635. At step 635, the method 600 may include attaching the optical fiber to an external body. For example, the first end 112 of the optical fiber 110 may be attached to the external body. In an example embodiment, the first end 112 of the optical fiber 110 may be bonded or otherwise secured to the external body.

In some embodiments, the method 600 may include securing a portion of the optical fiber 110 using a mechanical immobilizer, such as the mechanical immobilizer 130. The mechanical immobilizer may be closed about a portion of the optical fiber 110 to immobilize the optical fiber 110 to prevent misalignment prior to attaching the optical fiber 110 to the external body. The mechanical immobilizer may be used when a holding force greater than the vacuum holding force is utilized to prevent misalignment.

It should be appreciated that the specific steps illustrated in FIG. 6 provide a particular method for aligning and positioning an optical fiber using an optical fiber alignment and positioning system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Various examples of the present invention are provided below. As used below, any reference to a series of examples is to be understood as a reference to each of those examples disjunctively (e.g., "Examples 1-4" is to be understood as "Examples 1, 2, 3, or 4").

Example 1 is an optical fiber alignment and positioning system comprising a vacuum stage having a first end and second end, wherein the vacuum stage comprises: a vacuum inlet operable to be in fluid communication with a vacuum source; one or more passages extending through the vacuum stage; and a plurality of vacuum ports in fluid communication with the one or more passages. The optical fiber alignment and positioning system also includes an optical fiber channel extending from the first end of the vacuum stage to the second end of the vacuum stage, wherein: the plurality of vacuum ports pass through the optical fiber channel; the optical fiber channel comprises a first wall and a second wall; the first wall and the second wall comprise a directional friction surface; the directional friction surface is characterized by a first friction factor in a first direction and a second friction factor in a second direction; and the first friction factor is higher than the second friction factor; and an image sensor configured to generate an image of an emission face of an optical fiber disposed within the optical fiber channel.

Example 2 is the optical fiber alignment and positioning system of example(s) 1, wherein: the optical fiber channel comprises a v-groove formed by the first wall and the second wall; and the plurality of vacuum ports pass through the first wall and the second wall.

Example 3 is the optical fiber alignment and positioning system of example(s) 1, wherein the plurality of vacuum ports are configured to apply a vacuum on an optical fiber disposed within the optical fiber channel.

Example 4 is the optical fiber alignment and positioning system of example(s) 1, wherein the directional friction surface comprises a directional friction coating on the first wall and the second wall of the optical fiber channel.

Example 5 is the optical fiber alignment and positioning system of example(s) 1, wherein the vacuum stage comprises the directional friction surface.

Example 6 is the optical fiber alignment and positioning system of example(s) 1, further comprising a mechanical immobilizer configured to secure an optical fiber disposed in the optical fiber channel.

Example 7 is the optical fiber alignment and positioning system of example(s) 6, wherein the mechanical immobilizer is positioned between the first end of the vacuum stage and the image sensor.

Example 8 is the optical fiber alignment and positioning system of example(s) 1, wherein the directional friction surface contacts at least a portion of the optical fiber and allows for movement of the optical fiber in the second direction but resists movement of the optical fiber in the first direction.

Example 9 is the optical fiber alignment and positioning system of example(s) 1, wherein the first direction is an axial direction and the second direction is a rotational direction.

Example 10 is the optical fiber alignment and positioning system of example(s) 1, wherein the directional friction surface comprises a directional microstructure.

Example 11 is the optical fiber alignment and positioning system of example(s) 10, wherein the directional microstructure comprises a pattern of frictional lines defining, in part, the first friction factor.

Example 12 is the optical fiber alignment and positioning system of example(s) 10, wherein the directional microstructure comprises a composite material.

Example 13 is the optical fiber alignment and positioning system of example(s) 1, wherein the directional friction surface comprises a first material having embedded particulates.

Example 14 is a method for aligning and positioning an optical fiber comprising: providing an optical fiber alignment and positioning system including a vacuum stage having a first end and second end, wherein the vacuum stage comprises: a vacuum inlet operable to be in fluid communication with a vacuum source; one or more passages extending through the vacuum stage; a plurality of vacuum ports in fluid communication with the one or more passages; and an optical fiber channel extending from the first end of the vacuum stage to the second end of the vacuum stage, wherein: the plurality of vacuum ports pass through the optical fiber channel; the optical fiber channel comprises a first wall and a second wall; the first wall and the second wall comprise a directional friction surface; the directional friction surface is characterized by a first friction factor in a first direction and a second friction factor in a second direction; and the first friction factor is higher than the second friction factor; placing an optical fiber in the optical fiber channel such that at least a portion of the optical fiber is in contact with the directional friction surface; modifying a position of the optical fiber by moving the optical fiber in the second direction to a modified position; determining an alignment offset; and comparing the alignment offset to an alignment threshold.

Example 15 is the method of example(s) 14, further comprising applying a vacuum to a portion of the optical fiber, wherein the vacuum is applied via the plurality of vacuum ports to the portion of the optical fiber.

Example 16 is the method of example(s) 14, further comprising: determining that the alignment offset is within the alignment threshold and, thereafter, closing a mechanical immobilizer about a portion of the optical fiber to immobilize the optical fiber; and aligning the optical fiber with a component and, thereafter, opening the mechanical immobilizer about the optical fiber to release the optical fiber.

Example 17 is the method of example(s) 14, further comprising: determining that the alignment offset is within the alignment threshold; and securing a first end of the optical fiber to a component.

Example 18 is the method of example(s) 17, wherein securing the first end of the optical fiber to the component comprises bonding the first end of the optical fiber to the component.

Example 19 is the method of example(s) 14, wherein the first direction is an axial direction and the second direction is a rotational direction, and wherein modifying the position of the optical fiber comprises rotating the optical fiber in the rotational direction to the modified position.

Example 20 is the method of example(s) 14, wherein the directional friction surface comprises a directional microstructure.

Example 21 is the method of example(s) 20, wherein the directional microstructure comprises a pattern of frictional lines defining, in part, the first friction factor.

Example 22 is the method of example(s) 14, wherein the directional friction surface comprises a directional friction coating on the first wall and the second wall of the optical fiber channel.

Example 23 is the method of example(s) 14, further comprising: determining that the alignment offset is not within the alignment threshold; modifying the optical fiber to a further modified position by moving the optical fiber in the second direction; determining a second alignment offset; determining the second alignment offset is within the alignment threshold; and securing a first end of the optical fiber to a component.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical fiber alignment and positioning system comprising:
   a vacuum stage having a first end and second end, wherein the vacuum stage comprises:
      a vacuum inlet operable to be in fluid communication with a vacuum source;
      one or more passages extending through the vacuum stage; and
      a plurality of vacuum ports in fluid communication with the one or more passages;
      an optical fiber channel extending from the first end of the vacuum stage to the second end of the vacuum stage, wherein:
         the plurality of vacuum ports pass through the optical fiber channel;
         the optical fiber channel comprises a first wall and a second wall;
         the first wall and the second wall comprise a directional friction surface;
         the directional friction surface is characterized by a first friction factor in a first direction and a second friction factor in a second direction; and
         the first friction factor is higher than the second friction factor; and
   an image sensor configured to generate an image of an emission face of an optical fiber disposed within the optical fiber channel.

2. The optical fiber alignment and positioning system of claim 1, wherein:
   the optical fiber channel comprises a v-groove formed by the first wall and the second wall; and
   the plurality of vacuum ports pass through the first wall and the second wall.

3. The optical fiber alignment and positioning system of claim 1, wherein the plurality of vacuum ports are configured to apply a vacuum on an optical fiber disposed within the optical fiber channel.

4. The optical fiber alignment and positioning system of claim 1, wherein the directional friction surface comprises a directional friction coating on the first wall and the second wall of the optical fiber channel.

5. The optical fiber alignment and positioning system of claim 1, wherein the vacuum stage comprises the directional friction surface.

6. The optical fiber alignment and positioning system of claim 1, further comprising a mechanical immobilizer configured to secure an optical fiber disposed in the optical fiber channel.

7. The optical fiber alignment and positioning system of claim 6, wherein the mechanical immobilizer is positioned between the first end of the vacuum stage and the image sensor.

8. The optical fiber alignment and positioning system of claim 1, wherein the directional friction surface contacts at least a portion of the optical fiber and allows for movement of the optical fiber in the second direction but resists movement of the optical fiber in the first direction.

9. The optical fiber alignment and positioning system of claim 1, wherein the first direction is an axial direction and the second direction is a rotational direction.

10. The optical fiber alignment and positioning system of claim 1, wherein the directional friction surface comprises a directional microstructure.

11. The optical fiber alignment and positioning system of claim 10, wherein the directional microstructure comprises a pattern of frictional lines defining, in part, the first friction factor.

12. The optical fiber alignment and positioning system of claim 10, wherein the directional microstructure comprises a composite material.

13. The optical fiber alignment and positioning system of claim 1, wherein the directional friction surface comprises a first material having embedded particulates.

14. A method for aligning and positioning an optical fiber, the method comprising:
   providing an optical fiber alignment and positioning system including a vacuum stage having a first end and second end, wherein the vacuum stage comprises:
      a vacuum inlet operable to be in fluid communication with a vacuum source;
      one or more passages extending through the vacuum stage;
      a plurality of vacuum ports in fluid communication with the one or more passages; and
      an optical fiber channel extending from the first end of the vacuum stage to the second end of the vacuum stage, wherein:
         the plurality of vacuum ports pass through the optical fiber channel;
         the optical fiber channel comprises a first wall and a second wall;
         the first wall and the second wall comprise a directional friction surface;
         the directional friction surface is characterized by a first friction factor in a first direction and a second friction factor in a second direction; and
         the first friction factor is higher than the second friction factor;
   placing an optical fiber in the optical fiber channel such that at least a portion of the optical fiber is in contact with the directional friction surface;
   modifying a position of the optical fiber by moving the optical fiber in the second direction to a modified position;
   determining an alignment offset; and
   comparing the alignment offset to an alignment threshold.

15. The method of claim 14, further comprising:
   determining that the alignment offset is within the alignment threshold and, thereafter, closing a mechanical immobilizer about a portion of the optical fiber to immobilize the optical fiber; and
   aligning the optical fiber with a component and, thereafter, opening the mechanical immobilizer about the optical fiber to release the optical fiber.

16. The method of claim 14, further comprising:
   determining that the alignment offset is within the alignment threshold; and
   securing a first end of the optical fiber to a component.

17. The method of claim 14, wherein the first direction is an axial direction and the second direction is a rotational direction, and wherein modifying the position of the optical fiber comprises rotating the optical fiber in the rotational direction to the modified position.

18. The method of claim 14, wherein the directional friction surface comprises a directional microstructure.

19. The method of claim 14, wherein the directional friction surface comprises a directional friction coating on the first wall and the second wall of the optical fiber channel.

20. The method of claim 14, further comprising:

determining that the alignment offset is not within the alignment threshold;

modifying the optical fiber to a further modified position by moving the optical fiber in the second direction;

determining a second alignment offset;

determining the second alignment offset is within the alignment threshold; and securing a first end of the optical fiber to a component.

* * * * *

UNITED STATES PATENT AND TRADEMARK OFFICE
CERTIFICATE OF CORRECTION

| | | |
|---|---|---|
| PATENT NO. | : 12,332,485 B2 | Page 1 of 1 |
| APPLICATION NO. | : 18/121448 | |
| DATED | : June 17, 2025 | |
| INVENTOR(S) | : Joseph Lawson | |

It is certified that error appears in the above-identified patent and that said Letters Patent is hereby corrected as shown below:

In the Specification

Please insert the following heading and paragraph in Column 1, Line 14 of the description, immediately following the first full paragraph:
--STATEMENT REGARDING FEDERALLY SPONSORED RESEARCH OR DEVELOPMENT
This invention was made with Government support under Contract N68936-19-F-0001 awarded by The United States Navy. The Government has certain rights in the invention.--

Signed and Sealed this
Third Day of February, 2026

John A. Squires
*Director of the United States Patent and Trademark Office*